March 9, 1943. H. G. CLIFTON 2,313,222
AUTOMOBILE SIGNAL
Filed Aug. 11, 1941 3 Sheets-Sheet 1

Harry G. Clifton
INVENTOR

BY Victor J. Evans & Co.
ATTORNEYS

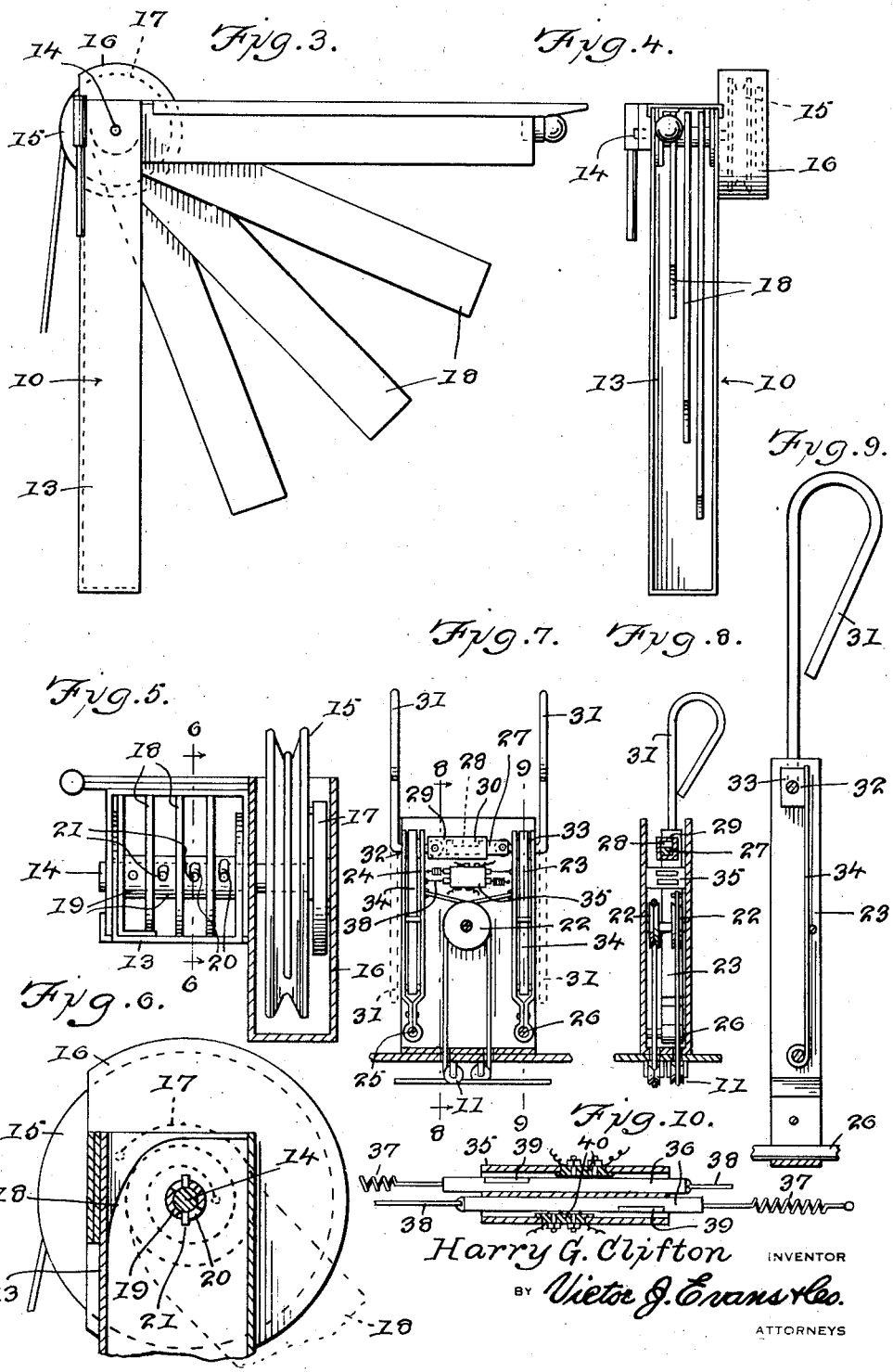

March 9, 1943.  H. G. CLIFTON  2,313,222
AUTOMOBILE SIGNAL
Filed Aug. 11, 1941  3 Sheets-Sheet 3

INVENTOR.
Harry G. Clifton
BY
Victor J. Evans & Co.
ATTORNEYS

Patented Mar. 9, 1943

2,313,222

UNITED STATES PATENT OFFICE 2,313,222

AUTOMOBILE SIGNAL

Harry G. Clifton, Miami, Fla.

Application August 11, 1941, Serial No. 406,378

3 Claims. (Cl. 116—53)

This invention relates to automobile signals, and more particularly to those of the semaphore type.

Devices of the type by which the driver of a car may signal right or left turns have long occupied the attention of in. entors. Likewise, some signals of this type have been made which make use of pivoted arms or semaphores, but, so far as I am aware, no one has developed a device having the specific advantageous combination and arrangement of parts of that embodied in my invention.

The object of this invention is convenience in the operation of automobile signals.

Another object is an automobile signal device which may be operated without removing the hands from the steering wheel.

Still another object is an easily installed device for accomplishing the above results.

These and other objects may be accomplished by my invention which embodies among its features a semaphore means including a plurality of arms, a shaft for said arms, pins and staggered apertures to raise the semaphores to varying heights, a pulley and cord to operate each semaphore, a lever means to operate each cord, and catch means to hold an arm on each lever in raised or lowered position. There is also a bar and sleeve means between the levers to limit the movement of either of them.

Other objects and features may become evident from the following disclosure when taken in connection with the accompanying drawings in which, Figure 1 is a side view, partly in cross-section, of an automobile showing my device installed, Figure 2 is a cross-section taken on line 2—2 of Figure 1, Figure 3 is a side elevation of one of the semaphores, Figure 4 is an end elevation of Figure 3, Figure 5 is a bottom plan view of a semaphore.

Fig. 6 is a cross-section taken on line 6—6 of Figure 5,

Figure 7 is a vertical cross-section of my control means,

Figure 8 is a cross-section taken on line 8—8 of Figure 7,

Figure 9 is a cross-section taken on line 9—9 of Figure 7,

Figure 10 is a horizontal cross-section through my electric switch,

Figure 1:
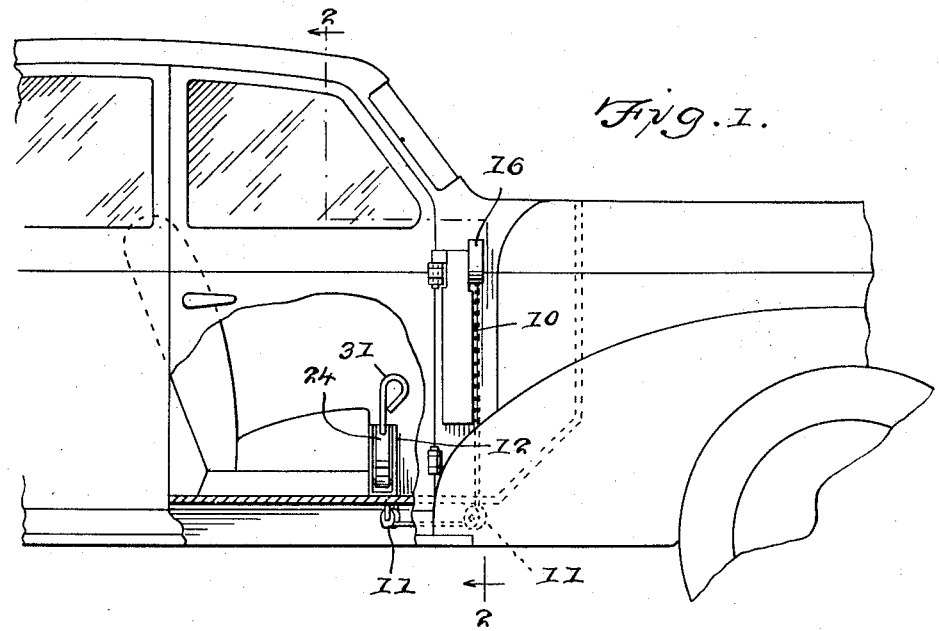
Figure 2:
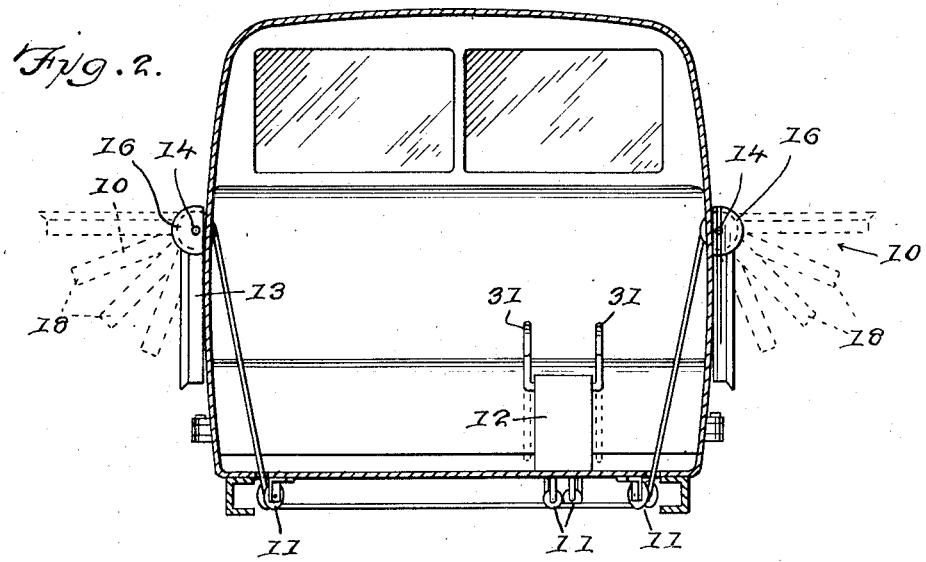
Figure 11:
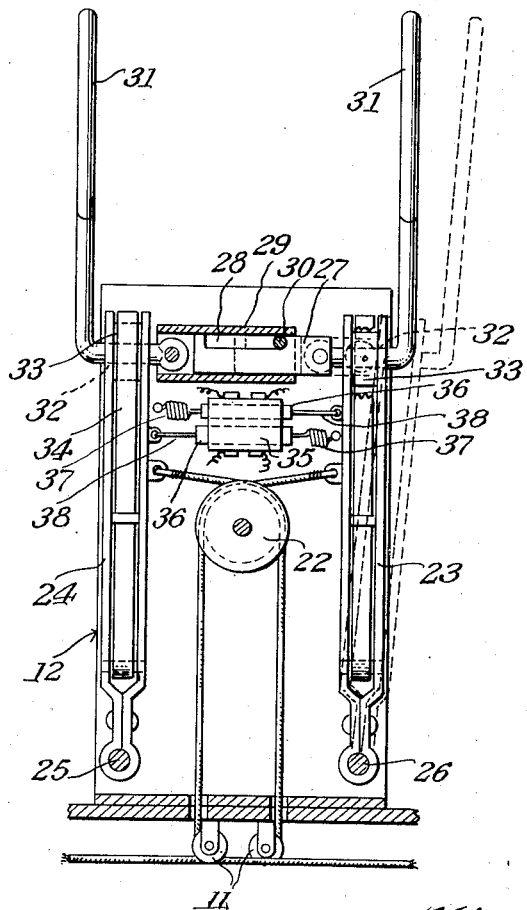
Figure 11 is an enlarged longitudinal section through the control means.
Figure 12:
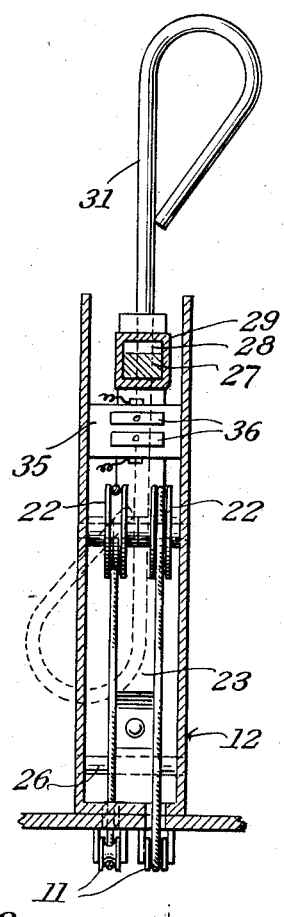
Figure 12 is a vertical transverse section through the same.
Figure 13:
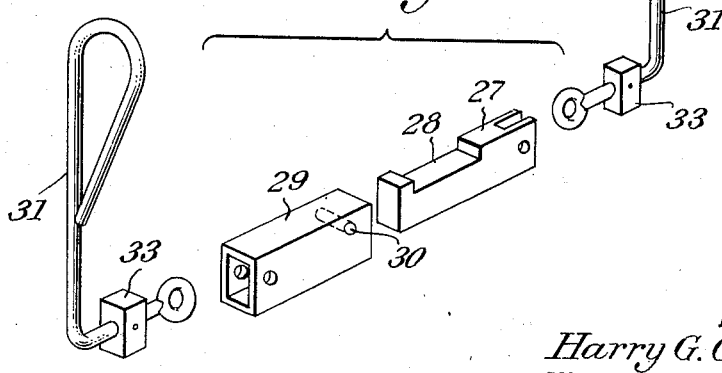
Figure 13 is a perspective view of the lever connecting means with parts in separated relation.

Referring to the drawings in detail, as shown in Figures 1 and 2, the semaphores 10 are mounted on either side of the car in any convenient spot such as the upper door hinge. The cords which control the semaphores run over idler pulleys 11 to the control box 12.

Each semaphore is as shown in Figures 3 to 6, with a casing 13 in which is journaled a shaft 14 carrying a pulley 15 fixed thereon. There is a housing 16 around the pulley, and a spring 17 operates therein to keep the semaphore arms in closed position. Said semaphore arms 18 are rotatably mounted on the shaft 14, having hubs 19 with holes 20 and pins 21 on the shaft operating therein. The holes are staggered as to length, so that when the pulley is given a quarter turn the arms are raised into the positions shown in Figure 3.

The control box 12 is positioned adjacent the front of the seat of the car, in position to be operated by the knee of the driver. The semaphore cords run in from the bottom passing over idler pulleys 22 on the front and back of the casing, and are secured to levers 23 and 24. These levers are pivoted at 25 and 26 on pins, and a short deflection outward for either lever will operate the corresponding semaphore. The levers are connected together by a bar 27 which has an elongated notch 28 and a sleeve 29 which carries a pin 30 to engage this notch to limit the outward motion of the levers.

These levers are operated through the medium of operating members or handles 31 having main looped portions and right angular pivot portions journaled in bearing apertures 32 in the levers. On each of these pivot portions are fixedly secured square elements 33 disposed to turn with the operating members. A leaf spring 34 carried by each lever has its free end pressed against the square element so as to yieldingly hold each operating member in upwardly extended operating position or in retracted depending inoperative position.

There is also, within the control casing, an electric switch 35, shown more clearly in Figure 10. This consists of plungers 36, held at one end by springs 37 and attached at the other end by rod 38 to levers 23 and 24. There are electrodes 39 and contact plates 40 coacting therewith, the surrounding portions being made of insulating material. It will readily be seen that contact is made through this switch in accordance with which lever is operated. The object of the switch is to operate the semaphores by motors, if desired, and also to operate lights, etc.

In operation, the semaphores may be operated by the pressure of the knee of the driver on one of the levers. Although a preferred embodiment of the device is disclosed herein I do not wish to be limited thereto but only by the scope of the appended claims.

What is claimed is:

1. In a signaling device, a pair of semaphores mounted in signaling positions on a vehicle, a pair of pivotally supported levers mounted in parallel positions, means connecting the semaphores with the respective levers for operative movement of the former by the latter, means between and connecting the levers for limiting movement thereof, a pair of operating members pivotally connected to the respective levers for positioning in elevated operative arrangement and lowered inoperative arrangement, and means operative to yieldingly hold the said operating members in adjusted position.)

2. In signal apparatus for vehicles, having movable signal members, a pair of levers having operative connection with respective signal members, to said levers being normally urged to approximately parallel non-signaling positions and operable to swing laterally for effecting signaling movement of the respective signal members, a pair of handles pivotally connected to the free ends of the levers disposed to swing to retracted and extended operating positions, the said handles being mounted to assume spaced apart positions when extended for operation by the knee of an operator to actuate the respective levers, and means mounted on the levers for releasably retaining the said handles in adjusted position.

3. In vehicle signal apparatus having movable signal members, a support, a pair of levers pivotally mounted on the support and having operative connection with respective signal members, the said levers being normally urged to inward non-signaling positions on the support and operable to swing outward to independently effect signaling movement of the respective signal members, a pair of handles pivotally connected to the free ends of the levers disposed to swing to retracted positions beside the levers and to extended operating positions projecting longitudinally of the levers, means connecting the handles so as to cause the same to turn in unison while enabling independent lateral movement by the knee of an operator to operatively actuate the respective levers, and means mounted on the levers for yieldingly holding the handles in extended or retracted positions.

HARRY G. CLIFTON.